(No Model.) 6 Sheets—Sheet 1.
T. H. WILCOX.
VEHICLE.

No. 510,624. Patented Dec. 12, 1893.

Witnesses
Chas. R. Michel
Arth. E. Michel

Inventor
Thomas H. Wilcox,
By Oscar A. Michel Atty (No Model.)

T. H. WILCOX.
VEHICLE.

No. 510,624.

6 Sheets—Sheet 2.

Patented Dec. 12, 1893.

Witnesses
Chas. R. Michel
Arth. E. Michel

Inventor
Thomas H. Wilcox,
By Oscar A. Michel, Atty (No Model.)
T. H. WILCOX.
VEHICLE.
No. 510,624.
6 Sheets—Sheet 6.
Patented Dec. 12, 1893.
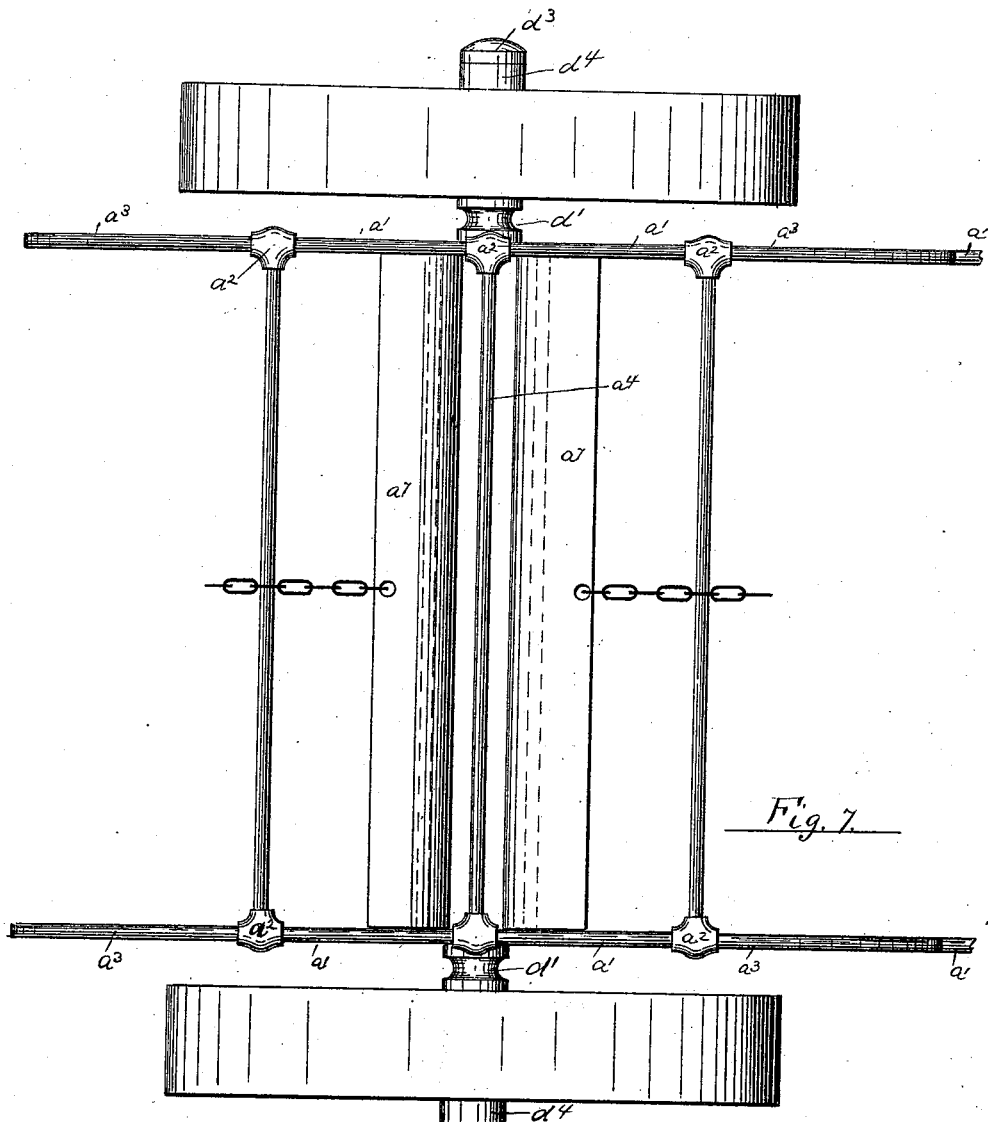
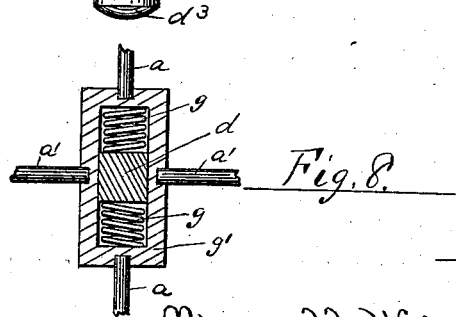
Witnesses
Chas. R. Michel
Arth. E. Michel
Inventor
Thomas H. Wilcox
By Oscar A. Michel Atty

United States Patent Office.

THOMAS H. WILCOX, OF BROOKLYN, NEW YORK.

VEHICLE.

SPECIFICATION forming part of Letters Patent No. 510,624, dated December 12, 1893.

Application filed August 13, 1892. Serial No. 443,001. (No model.)

*To all whom it may concern:*

Be it known that I, THOMAS H. WILCOX, a citizen of the United States, residing at No. 785 De Kalb avenue, in the city of Brooklyn, county of Kings, and State of New York, have invented certain new and useful Improvements in Vehicles; and I do hereby declare that the following is a full, clear, and exact description of the invention, which will enable others skilled in the art to which it appertains to make and use the same.

The object of my invention is to construct a vehicle of a simple and cheap character which will be light and durable and can be used advantageously for riding.

The invention consists in the improved vehicle, and in the arrangement and combination of its various parts and in the combination of parts hereinafter set forth and claimed.

Figure 1:
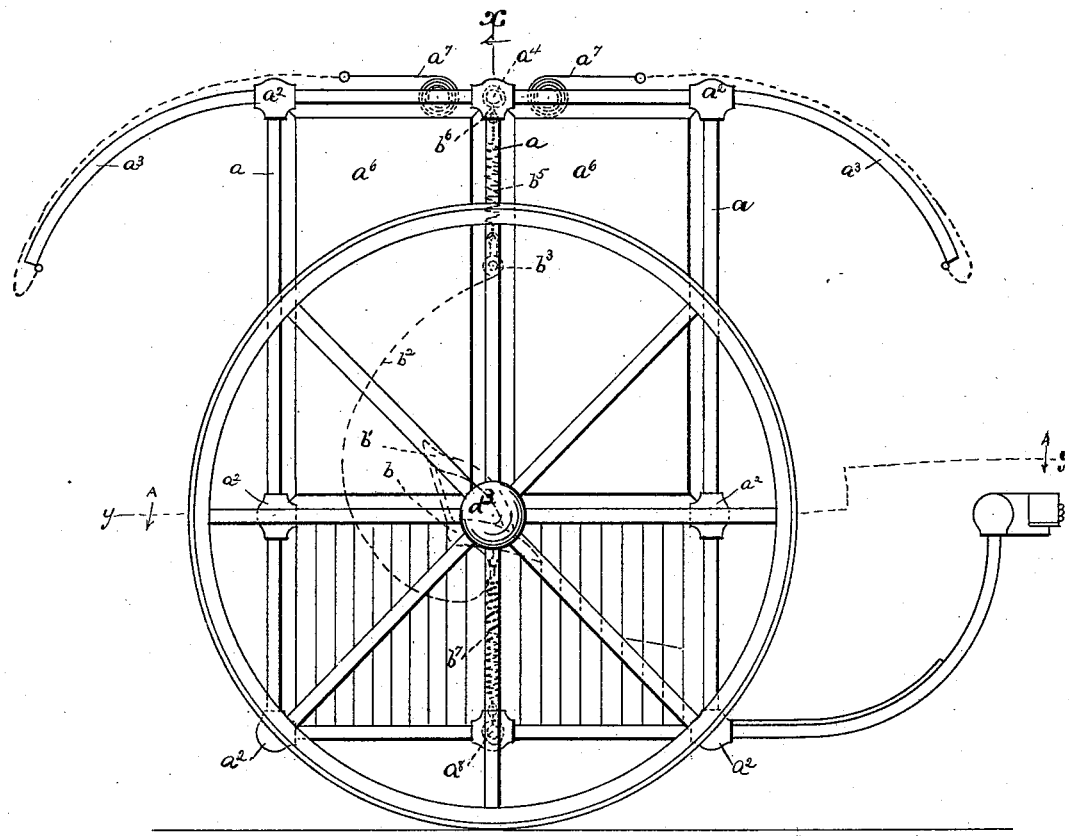
Figure 2:
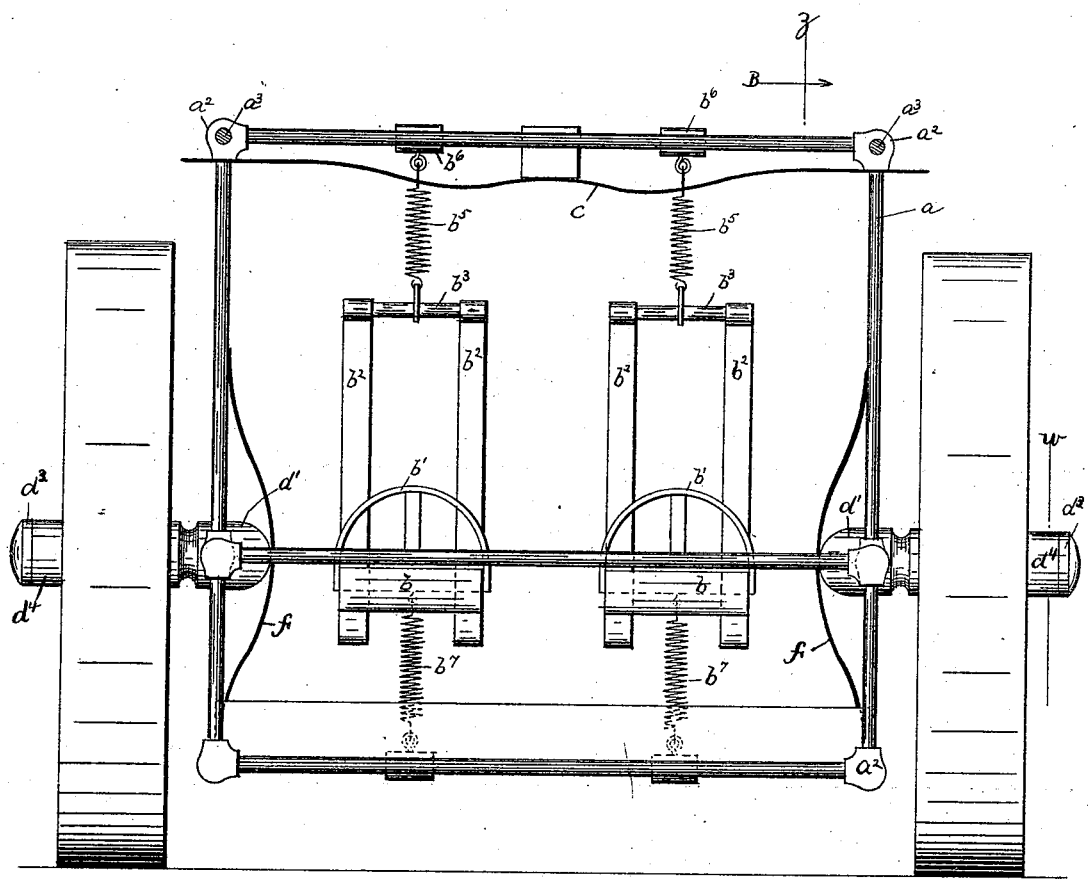
Figure 3:
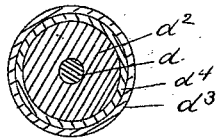
Figure 4:
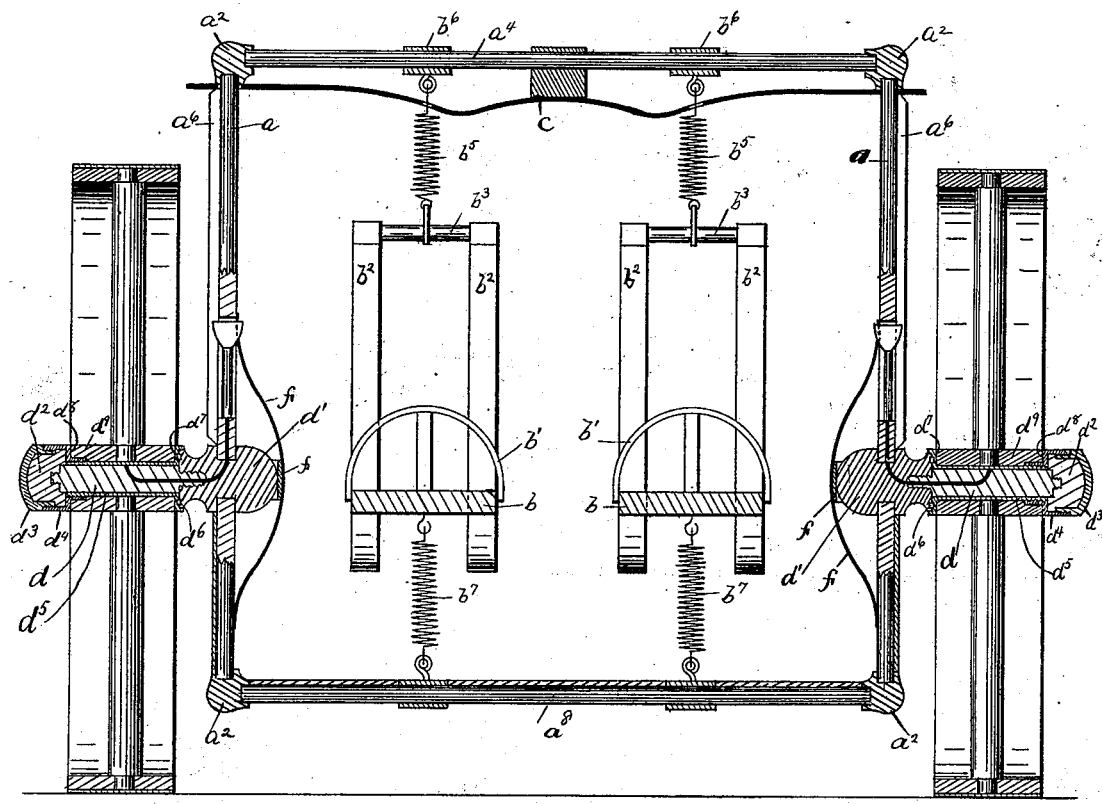
Figure 5:
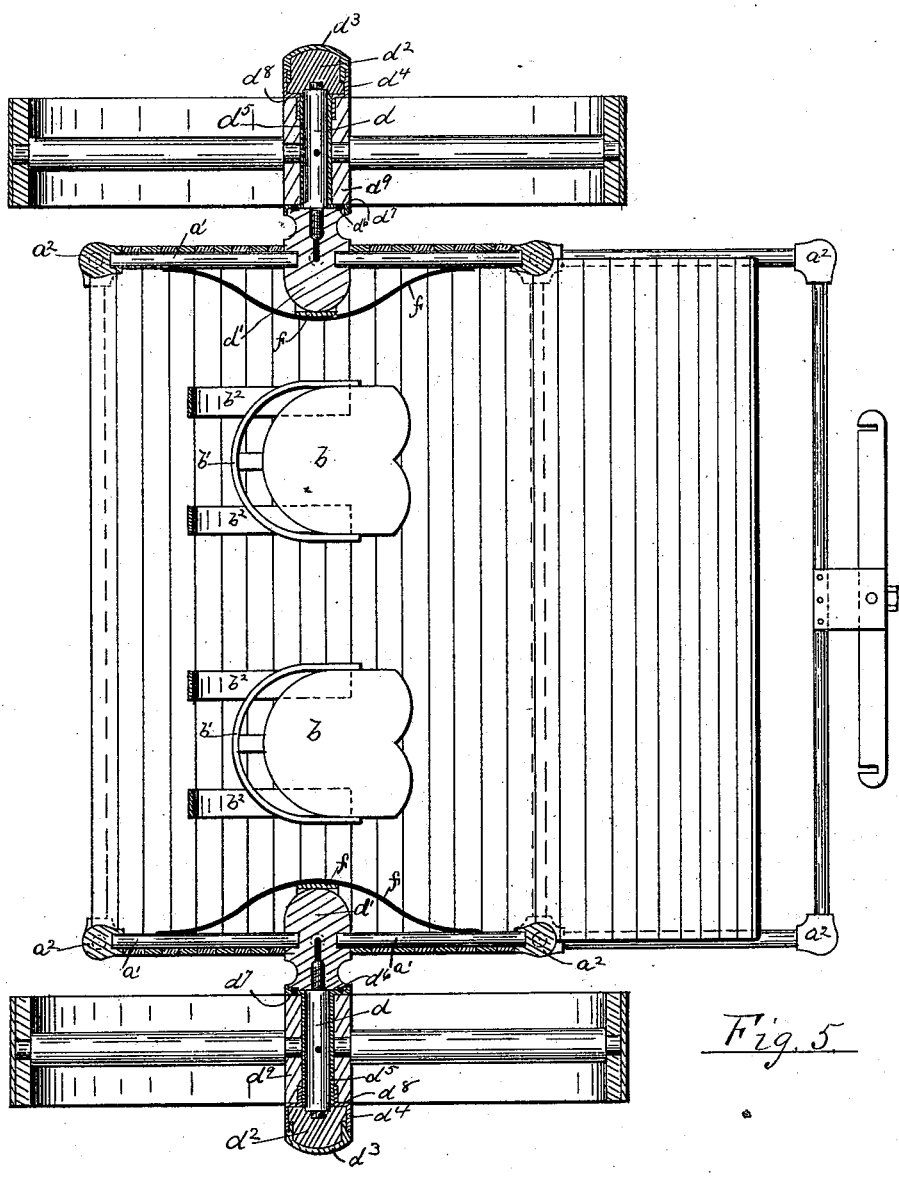
Figure 6:
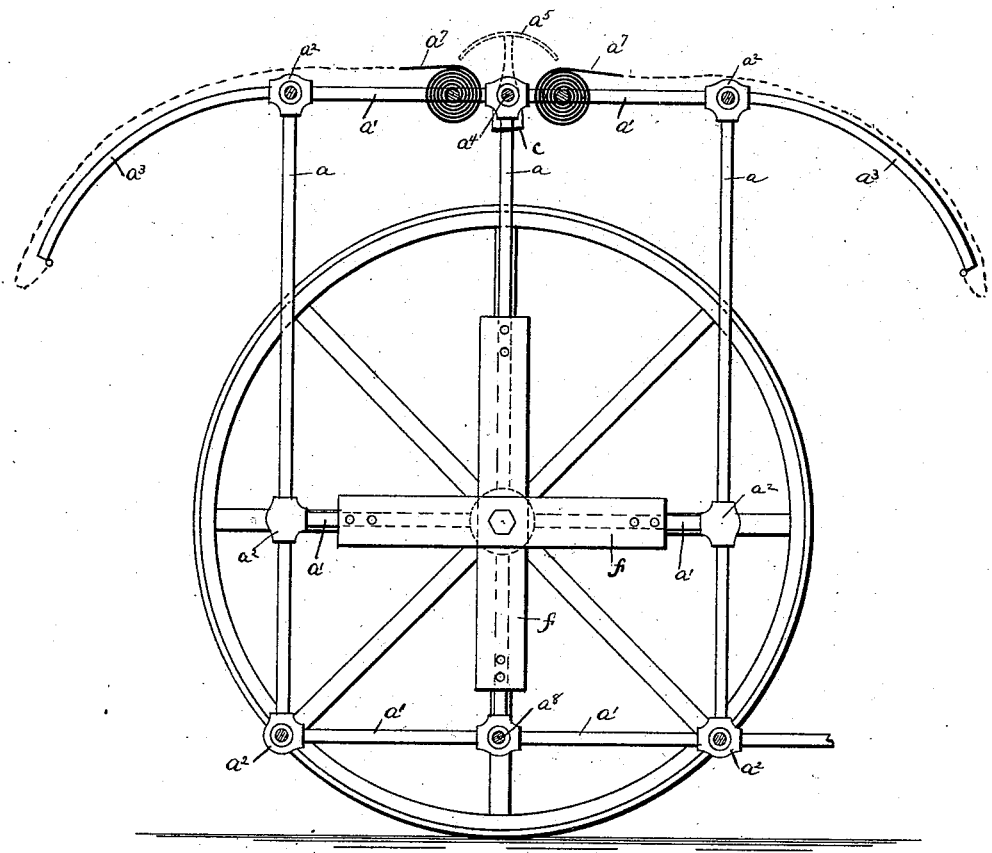

In the drawings, Figure 1 is a side elevation of my improved vehicle with the rear curtain supporting frame. Fig. 2 is a front view of the same; Fig. 3 an enlarged section on line $w$ of Fig. 2. Fig. 4 is a section on line $x$ of Fig. 1. Fig. 5 is a section on line $y$ of Fig. 1 looking in the direction of arrow A. Fig. 6 is a section on line $z$ of Fig. 2; looking in the direction of arrow B. Fig. 7 is a top plan view of the vehicle, and Fig. 8 is a detail showing a modification for fastening the axle to the body of the vehicle.

In said drawings the frame of the vehicle is composed of the vertical tubular bars $a$ connected at their extremities to the horizontal tubular bars $a'$ by elbows $a^2$. To the upper horizontal bars $a'$ is attached a frame work $a^3$ forming a curved extension front and rear to support a curtain or shield $a^7$ to protect the interior of the vehicle from the elements of the weather. In Fig. 6 the curtain is fastened at each side of the central horizontal bar $a^4$ and provided at the top with a hood $a^5$ attached to the frame work $a^4$.

At the sides of the vehicle may be placed panes or panels of glass $a^6$.

The flooring of the vehicle consists of narrow boards of pine or other wood.

The seat $b$ of the vehicle has an arm rest $b'$ and is fastened to the vehicle by the two steel springs $b^2$ which are attached to the bottom of the seat on both sides and are bent downward, then backward, then up and are fastened together at their upper ends by the rods $b^3$ passing through the eye holes $b^4$ in the springs $b^2$ and riveted.

To the center of the rod $b^3$ is fastened a coil spring $b^5$ which is attached by a swivel connection to the bearing $b^6$ secured to the horizontal bar $a^4$. To the bottom of the seat is fastened another coil spring $b^7$ which is attached to the horizontal bar $a^8$ supporting the floor of the vehicle. The coiled springs give to the seat an easy vibrating motion and the swivel connection with the bar $a^4$ enables the seat to be turned in either direction and so enables the occupant to enter the vehicle from the rear and then turn his seat to the front.

To the central horizontal bar $a^4$ is fastened a brace $c$ to make a firmer and stiffer support for the weight of the occupants in the vehicle.

The axle $d$ of the vehicle is fastened at one end to the tubular vertical bars $a$ by the head $d'$ and at the other end of the axle is placed the nut $d^2$ held in place by a cap $d^3$ secured in a box $d^4$. This box $d^4$ is screwed at one end to the shell $d^5$ which abuts against and over the head $d'$. Between the abutting ends of the shell $d^5$ and the head $d'$ is placed a packing $d^6$. Between the raised end $d^7$ of the shell $d^5$ and the raised end $d^8$ of the box $d^4$ is placed the hub $d^9$ of the vehicle. The shanks of the head $d'$ are supported by braces $f$ which allow a slight side motion to the axle.

Where it is desired to allow the body of the vehicle a slight up and down motion on the axle, or to take the strain off from the axle to a much greater degree, I have shown in Fig. 8 a coiled spring $g$ resting on the top and bottom of the axle $d$ which spring is inclosed in a box $g'$ to prevent the displacement of the same when weight is put upon the floor of the vehicle.

I do not wish to be understood as limiting myself to the exact construction shown and described for it is obvious that various changes in details may be made without departing from the spirit of my invention.

Having thus described my invention, what I claim as new, and desire to secure by Letters Patent of the United States, is—

1. In a vehicle, a body frame composed of upper, lower and side sections secured together by elbows substantially as described.

2. In a vehicle, a body frame composed of upper, lower and side sections secured together by elbows in combination with a seat suspended between the upper and lower sections and secured by swivel connection to the upper section substantially as described.

3. The combination in a vehicle of the body composed of upper, lower and side sections secured together by elbows with an axle secured to said side sections by a head, a shell covering said axle and held in position by a threaded nut, and a packing interposed between said head and said shell, substantially as and for the purposes set forth.

4. The combination in a vehicle of a frame work or body consisting of upper, lower and side tubular sections united together by elbows, a seat suspended between said upper and lower tubular sections by coiled springs and united to the said upper section by swivel connection, with an axle secured at one end to the side sections by a suitable head a shell covering said axle and held in position by a nut and cap and a packing interposed between the shell and head substantially as described.

5. The combination in a vehicle of a frame work or body consisting of upper, lower and side tubular sections united together by elbows, with coiled spring $g$ resting on the top and bottom of the axle $d$, and said spring inclosed in a box $g'$ secured to the side sections $a$, substantially as described.

THOMAS H. WILCOX.

Witnesses:
LINCOLN A. STUART,
J. HAWEY.